United States Patent [19]
Takahashi et al.

[11] Patent Number: 5,715,426
[45] Date of Patent: Feb. 3, 1998

[54] SET-ASSOCIATIVE CACHE MEMORY WITH SHARED SENSE AMPLIFIERS

[75] Inventors: Makoto Takahashi, Yokohama, Japan; Toshinari Takayanagi, Mountain View, Calif.

[73] Assignee: Kabushiki Kaisha Toshiba, Kanagawa-ken, Japan

[21] Appl. No.: 386,130

[22] Filed: Feb. 9, 1995

Related U.S. Application Data

[63] Continuation of Ser. No. 875,766, Apr. 29, 1992, abandoned.

[30] Foreign Application Priority Data

Apr. 30, 1991 [JP] Japan ................. 3-099240

[51] Int. Cl.[6] ............................ G06F 12/00
[52] U.S. Cl. .................. 395/455; 365/205; 365/207; 365/189.07
[58] Field of Search ............... 395/455; 365/49, 365/207, 205, 189.07

[56] References Cited

U.S. PATENT DOCUMENTS

| | | | |
|---|---|---|---|
| 3,845,474 | 10/1974 | Lange et al. | 395/446 |
| 4,811,209 | 3/1989 | Rubinstein | 395/471 |
| 4,884,197 | 11/1989 | Sachs et al. | 395/450 |
| 5,014,195 | 5/1991 | Farrell et al. | 395/455 |
| 5,019,971 | 5/1991 | Lefsky et al. | 395/455 |
| 5,133,061 | 7/1992 | Melton et al. | 395/455 |
| 5,253,197 | 10/1993 | Suzuki et al. | 365/49 |
| 5,313,613 | 5/1994 | Gregor | 395/455 |
| 5,522,056 | 5/1996 | Watanabe et al. | 395/455 |

FOREIGN PATENT DOCUMENTS

| | | |
|---|---|---|
| 2-3147 | 1/1990 | Japan . |
| 2003147 | 1/1990 | Japan . |
| 2-244479 | 9/1990 | Japan . |

*Primary Examiner*—Eddie P. Chan
*Assistant Examiner*—Reginald G. Bragdon
*Attorney, Agent, or Firm*—Finnegan, Henderson, Farabow, Garrett & Dunner, L.L.P.

[57] ABSTRACT

A cache memory employs a set-associative method for associating cached data with main storage data. The cache memory comprises memory cells MSs, sense amplifiers SAW0 through SAWs-1, s way hit signal generators 1-0 through 1-s-1 for searching directories of address tags of respective ways for a given tag and generating way hit signals W0HIT through Ws-1HIT accordingly, and controllers 3-1 through 3-s-1 for activating a sense amplifier SAWi corresponding to a hit way according to the way hit signals WiHIT, keeping the other sense amplifiers SAWj (j is not equal to i) inactive, and keeping all of the sense amplifiers SAWk (k=1, ..., s) OFF when a cache miss is detected.

6 Claims, 9 Drawing Sheets

CACHE MEMORY OF THE INVENTION

FIG.1 PRIOR ART

CACHE MEMORY OF PRIOR ART

FIG.3  EMBODIMENT OF THE INVENTION

CACHE MEMORY OF THE INVENTION

FIG.6  MODIFICATION OF THE INVENTION

FIG.7 MODIFICATION OF THE INVENTION

FIG.8  CACHE MEMORY OF THE INVENTION

FIG.9 MODIFICATION OF CACHE MEMORY OF THE INVENTION

SET-ASSOCIATIVE CACHE MEMORY WITH SHARED SENSE AMPLIFIERS

This application is a continuation of application Ser. No. 07/875,766 filed Apr. 29, 1992, now abandoned.

BACKGROUND OF THE INVENTION

1. Field of the Invention

This invention relates to a cache memory, and particularly to a cache memory having a wide read bit width and consuming low electric power.

2. Description of the Prior Art

To increase the capacity of a cache memory, the size of each memory cell must be reduced, and each sense amplifier must be designed according to minimum values of design rules. This raises a problem that each sense amplifier may be hardly sized within a bit pitch.

An on-chip cache memory packaged in the same chip as a microprocessor may have a read bit width of 32 or greater because the read bit width is not limited by I/O pins of the package. The wide bit width is accompanied by, however, many sense amplifiers, and accordingly, large power consumption.

These problems of the conventional cache memory will be explained more precisely.

Figure 1:
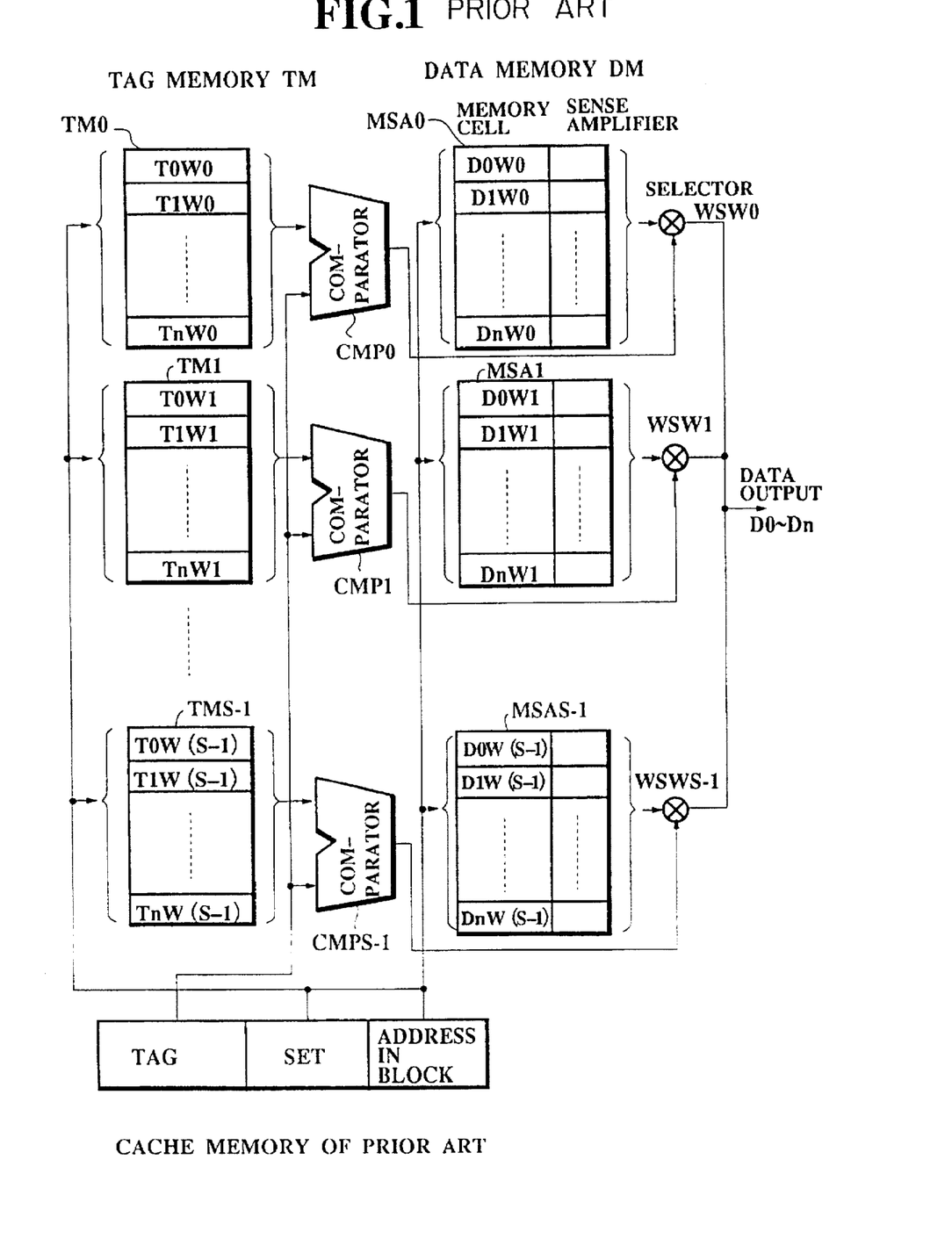
FIG. 1 is a schematic view showing a cache memory according to a prior art.

FIG. 1 shows an s-way set-associative cache memory of n+1 bits.

The cache memory comprises s pieces of tag memories TM0 through TMs-1, s pieces of comparators CMP0 through CMPs-1, and a data memory DM involving s ways of memory blocks MSA0 through MSAs-1. Each of the blocks MSA0 through MSAs-1 has a bit width of n+1, and each bit is provided with a sense amplifier. Output buffers (selectors) WSW0 through WSWs-1 are disposed after the sense amplifiers, to select one of the ways.

During a read cycle, all bits in every memory block are made ready to be read, and the output buffers WSW0 through WSWs-1 disposed after the sense amplifiers select one of the ways when a cache hit occurs, or none of the ways when no cache hit occurs, according to hit signals provided by the comparators CMP0 through CMPs-1.

The comparators CMP0 through CMPs-1 correspond to the ways, respectively, receive signals from the tag memories TM0 through TMs-1, respectively, as well as a signal from a tag TAG, and according to these signals, provide the hit signals to the output buffers WSW0 through WSWs-1, respectively. Each comparator searches a directory of address tags of the corresponding way for a given tag and produces the hit signal.

Power consumption of this kind of cache memory increases in proportion to the number of bits to be simultaneously read, i.e., a read bit width, because every sense amplifier of the cache memory is activated whenever a read operation is carried out. In addition, it is very difficult to lay each sense amplifier within a bit pitch if the number of the sense amplifiers is large.

To reduce the power consumption, a cache memory according to another prior art turns OFF sense amplifiers of unselected ways when one way is selected. This technique, however, keeps all of the sense amplifiers ON until one of the ways is selected during a read operation, so that the technique cannot remarkably save power consumption. In addition, this technique involves a complicated control logic for turning ON and OFF the sense amplifiers.

In this way, the conventional cache memories increase power consumption in proportion to the read bit width. Even if the sense amplifiers of unselected ways are turned OFF by the additional control circuit, its power consumption reducing effect is not so outstanding compared with the complicatedness of the additional control circuit.

SUMMARY OF THE INVENTION

An object of the invention is to provide a cache memory having a wide read bit width, consuming small power during a read operation, and causing no space problem in laying out sense amplifiers.

Figure 2:
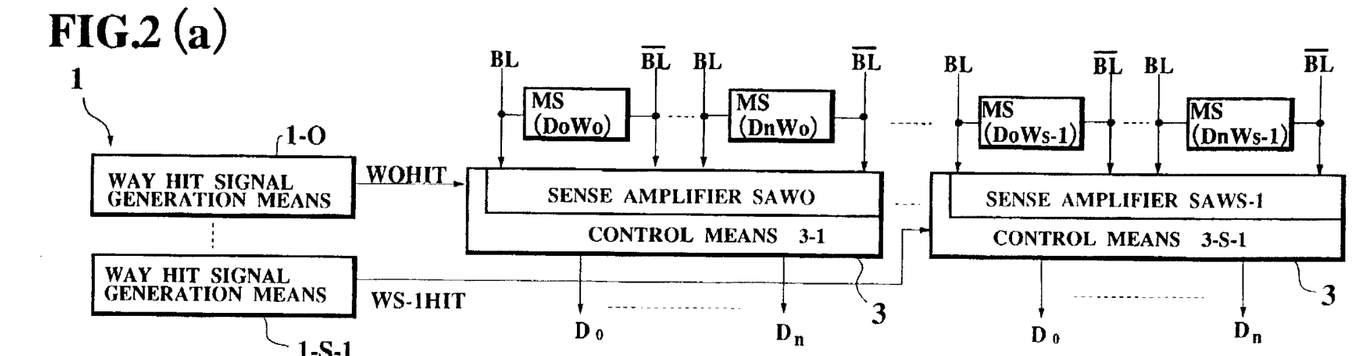
FIG. 2 is a schematic view showing a principle of the invention.

In order to accomplish the object, a first aspect of the invention shown in FIG. 2(a) provides a cache memory comprising memory cells MSs, a sense amplifier (differential amplifier) SA for amplifying weak potential differences read out of the memory cells MSs through pairs of bit lines, way hit signal generation means 1 for searching a directory of address tags and generating a way hit signal HIT according to a result of the search, and control means 3 for controlling the sense amplifier SA according to the way hit signal HIT in a manner to keep the sense amplifier SA inactive until a cache hit is detected, activate the sense amplifier SA in response to the cache hit, and keep the sense amplifier SA inactive if a cache miss is detected.

According to the way hit signal HIT, the control means 3 of this cache memory keeps the sense amplifier SA OFF until a cache hit is detected, turns ON the sense amplifier SA in response to the cache hit, and keeps the sense amplifier SA OFF if a cache miss is detected. This arrangement reduces power consumption during a read operation.

A second aspect of the invention shown in FIG. 2(a) provides an s-way set-associative cache memory employing a set-associative method for associating cached data with main storage data. The cache memory comprises memory cells MSs, sense amplifiers (differential amplifiers) SAW0 through SAWs-1 for amplifying weak potential differences read out of the memory cells MSs through pairs of bit lines, s pieces of way hit signal generation means 1-0 through 1-s-1 disposed for the ways, respectively, for searching address tag directories and generating way hit signals W0HIT through Ws-1HIT, respectively, and control means 3-1 through 3-s-1 for controlling the sense amplifiers SAW0 through SAWs-1 according to the way hit signals W0HIT through Ws-1HIT, respectively, in a manner to activate a sense amplifier SAWi corresponding to a hit way while keeping the other sense amplifiers SAWj (j is not equal to i) inactive, and keep all of the sense amplifiers SAWk (k=1 through s) inactive when a cache miss is detected.

According to the respective hit signals W0HIT through Ws-1HIT, the control means 3-1 through 3-s of this s-way set-associative cache memory turn ON a sense amplifier SAWi corresponding to a hit way while keeping the other sense amplifiers SAWj (j is not equal to i) OFF, and keep all of the sense amplifiers SAWk (k=1 through S) OFF if a cache miss is detected. This arrangement reduces power consumption during a read operation.

A third aspect of the invention shown in FIG. 2(b) provides a set-associative cache memory employing a set-associative method for associating cached data with main storage data. The cache memory comprises memory cells MSs and a sense amplifier (differential amplifier) SA for amplifying a weak potential difference read out of one of the memory cells MSs through a pair of bit lines. The cache memory involves at least two ways that share the single sense amplifier SA.

According to this cache memory, the single sense amplifier SA is shared by different ways, to reduce power consumption during a read operation.

A fourth aspect of the invention shown in FIG. 2(b) provides a cache memory employing a set associative method for associating cached data with main storage data. The cache memory involves at least two ways of memory cells MSs, sense amplifiers (differential amplifiers) SAD0 through SADn for amplifying weak potential differences read out of the memory cells MSs through pairs of bit lines, s pieces of way hit signal generation means 1-0 through 1-s-1 disposed for the ways, respectively, for searching address tag directories and generating way hit signals W0HIT through Ws-1HIT, an a plurality of MOS transistors. Each of the MOS transistors has a terminal connected to a bit line that is connected to an output end of a corresponding one of the memory cells MSs, another terminal connected to an input terminal of a corresponding one of the sense amplifiers SAD0 through SADn shared by the MOS transistors, and a gate terminal connected to a corresponding hit signal WiHIT. The MOS transistors are switched according to the hit signals WiHIT, to selectively connect the sense amplifiers SAD0 through SADn with the ways of the memory cells. This enables each one of the sense amplifiers SAD0 through SADn to be shared by different ways of the memory cells.

The MOS transistors of this cache memory serve as way selectors in the bit line pairs between the output ends of the memory cells MS(DiW0) through MS(DiWs-1) and the input ends of the sense amplifiers SADi, to enable the sense amplifiers SADi to be shared by the different ways. This arrangement is effective in reducing the number of sense amplifiers and saving power consumption in a read operation.

The read bit width of any one of the above cache memories may be 32 bits or more if the cache memory is a single port memory, and 16 bits or more if it is a multi-port memory, and the cache memory is fabricated on the same chip as a microprocessor.

These and other objects, features and advantages of the present invention will be more apparent from the following detailed description of preferred embodiments in conjunction with the accompanying drawings.

DETAILED DESCRIPTION OF THE EMBODIMENTS

Embodiments of the invention will be explained with reference to the drawings.

Figure 3:
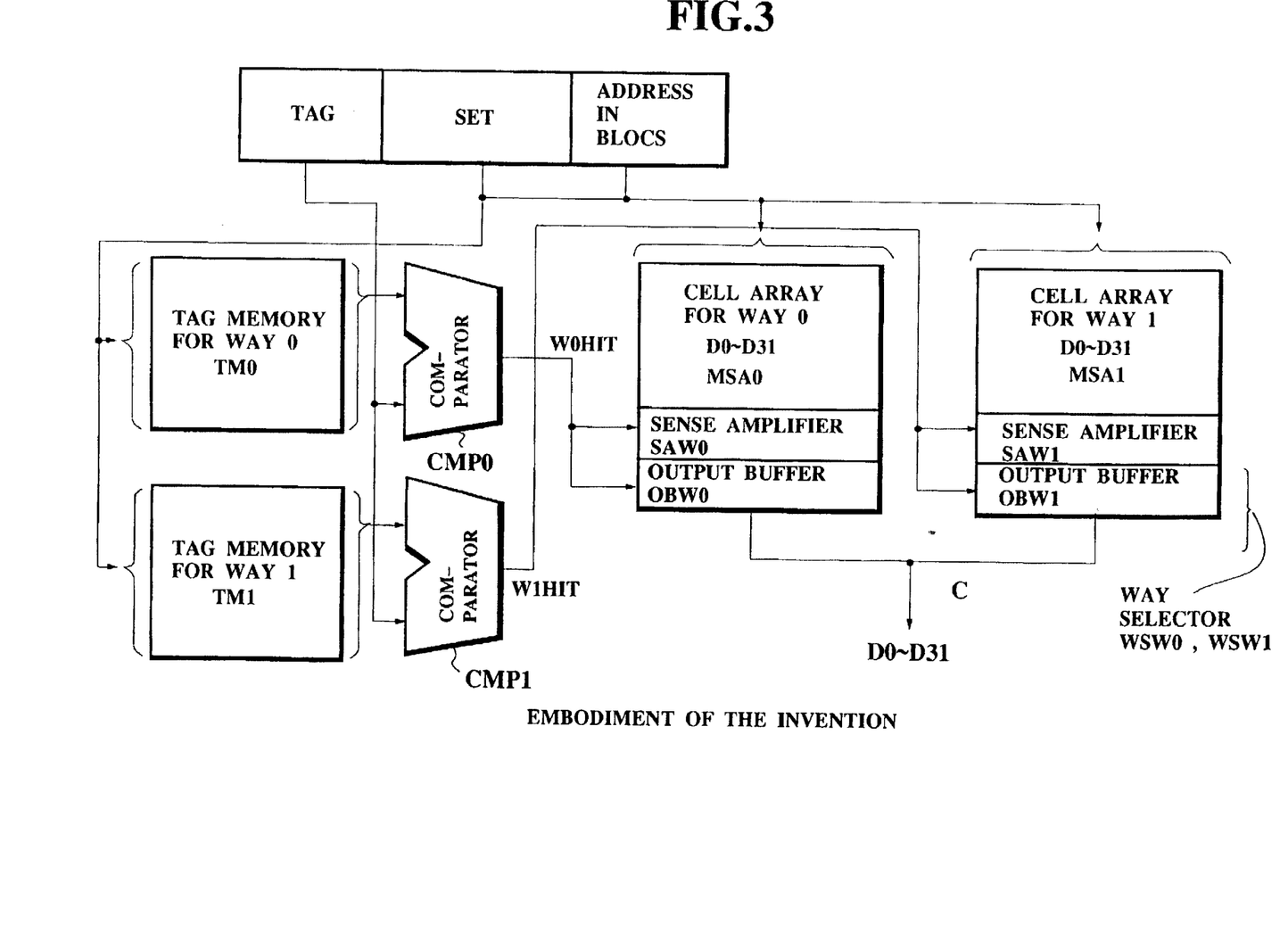
FIG. 3 is a schematic view showing a cache memory according to a first embodiment of the invention.

FIG. 3 is a schematic view showing a cache memory according to the first embodiment of the invention.

This cache memory is a 2-way set-associative cache memory having a read bit width of 32 bits (D0 through D31) and involving memory blocks of way 0 and way 1.

The way 0 of the cache memory involves a tag memory TM0, a comparator CMP0, and a data memory block. This data memory block includes a data memory cell array MSA0, a sense amplifier SAW0, and an output buffer OBW0. The way 1 of the cache memory involves a tag memory TM1, a comparator CMP1, and a data memory block. This data memory block includes a data memory cell array MSA1, a sense amplifier SAW1, and an output buffer OBW1.

The comparator CMP0 (CMP1) for the way 0 (1) receives a signal from the tag memory TM0 (TM1) and a signal from a tag TAG, and according to these signals, provides a way hit signal W0HIT (W1HIT) to the sense amplifier SAW0 (SAW1) and to the output buffer OBW0 (OBW1). Namely, the comparator CMP0 (CMP1) searches a directory of address tags of the way 0 (1) for a given tag and provides the way hit signal W0HIT (W1HIT).

When a cache hit occurs in the way 0, the comparator CMP0 provides the way hit signal W0HIT, and when it occurs in the way 1, the comparator CMP1 provides the way hit signal W1HIT. The way hit signal W0HIT (W1HIT) enables the terminals of the sense amplifier SAW0 (SAW1) and output buffer OBW0 (OBW1). This output buffer serves as a way selector WSW0 (WSW1). As a result, the sense amplifier SAW0 (SAW1) of the hit way 0 (1) is activated, and the output buffer OBW0 (OBW1) is turned ON.

According to the invention, the comparators CMP0 and CMP1 provide the way hit signals W0HIT and W1HIT according to the signals from the tag TAG and tag memories TM0 and TM1, and if a cache hit occurs, only one of the sense amplifiers SAW0 and SAW1 corresponding to a hit way is activated according to the signals W0HIT and W1HIT, while the other sense amplifier is not activated. If a cache miss occurs, none of the sense amplifiers SAW0 and SAW1 is activated.

In this way, the invention reduces power consumption in a read operation.

Figure 4:
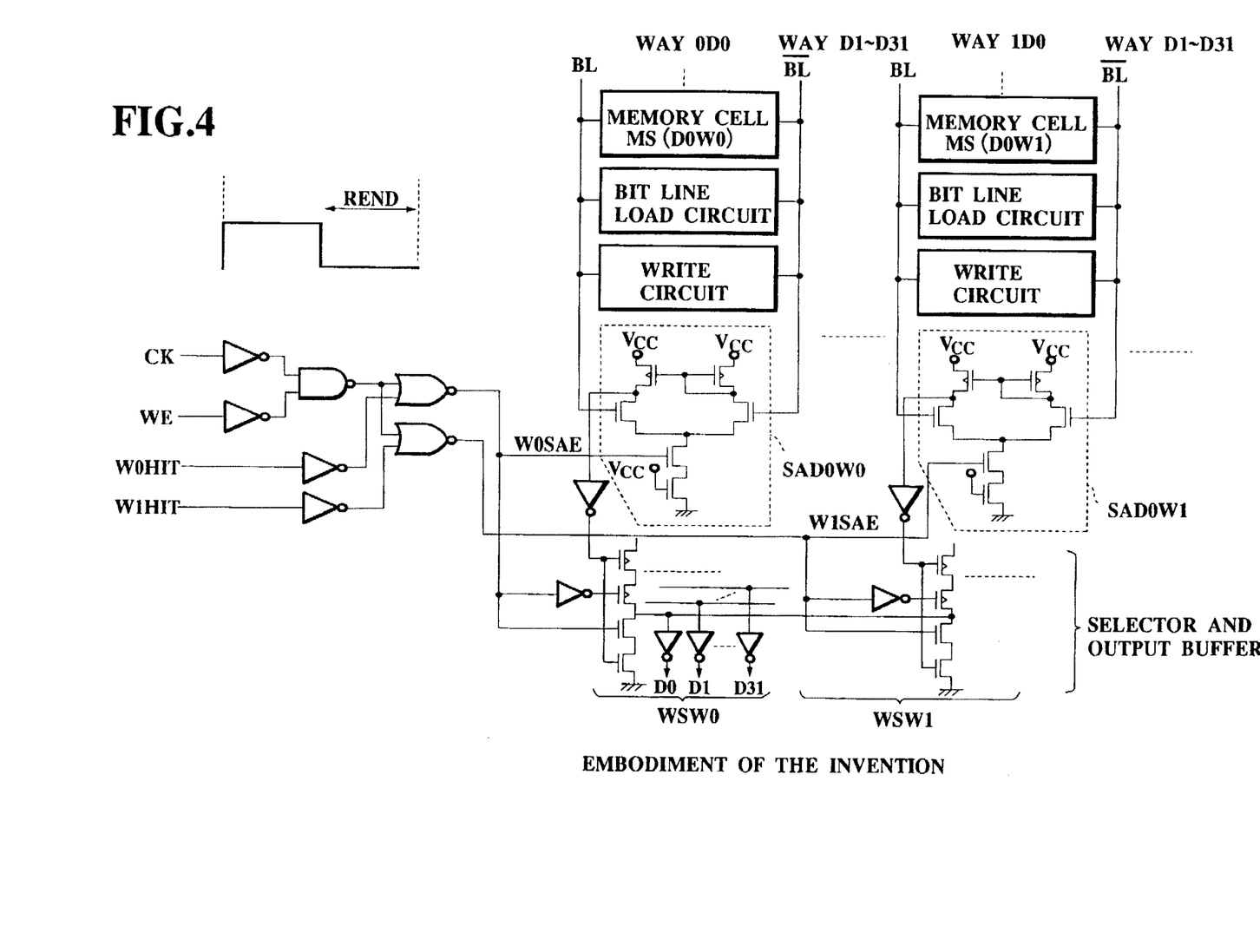
FIG. 4 is a view showing the details of the cache memory according to the first embodiment of FIG. 3.

FIG. 4 shows the details of the cache memory according to the first embodiment of the invention.

In a read cycle, the way hit signals W0HIT and W1HIT from the comparators CMP0 and CMP1 form sense amplifier enable signals W0SAE and W1SAE, respectively.

The sense amplifier enable signal W0SAE (W1SAE) is supplied to the enable terminals of sense amplifiers SAD0W0 through SAD31W0 (SAD0W1 through SAD31W1) corresponding to bits D0 through D31 of the data memory block of the way 0 (1). When a hit occurs in any one of the ways 0 and 1, corresponding ones of the sense amplifiers are activated at once.

The sense amplifier enable signals W0SAE and W1SAE are also supplied to the enable terminals of the output buffers, to select one of the ways 0 and 1.

Figure 5:
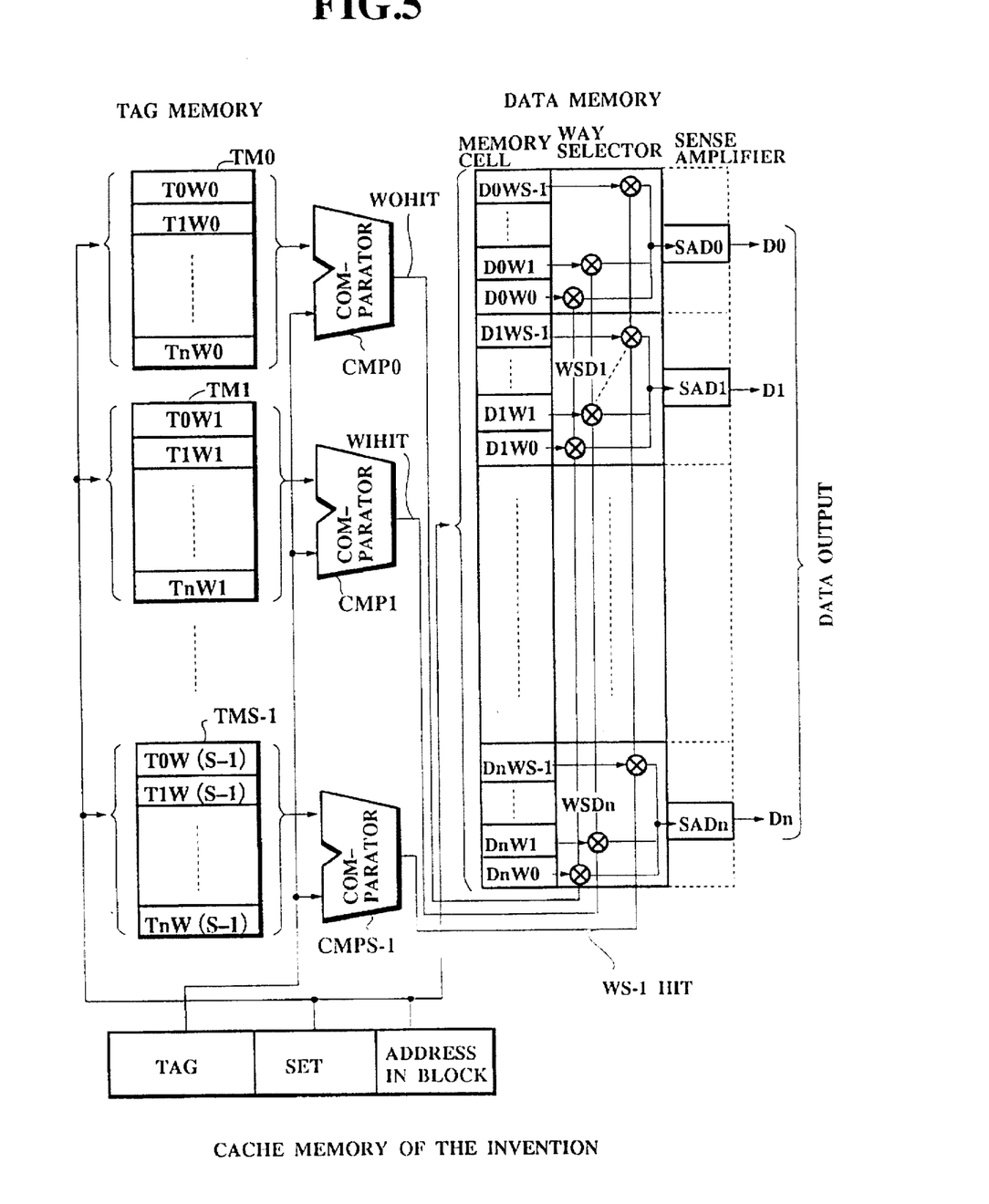
FIG. 5 is a schematic view showing an s-way cache memory according to a second embodiment of the invention.

FIG. 5 shows a cache memory according to the second embodiment of the invention. This cache memory is an s-way set-associative cache memory comprising s pieces of tag memories TM0 through TMs-1, s pieces of comparators CMP0 through CMPs-1, and a data memory DM having a bit width of n+1.

The data memory DM comprises memory cell arrays MSAs each including a group of the same bits of different ways. In each memory cell array MSA, a pair of bit lines for each bit is provided with a way selector element, and each memory cell array MSA is provided with a sense amplifier SADi. The way selector elements of each memory cell array MSA collectively form a selector WSDi.

The selectors WSDi are controlled according to hit signals WiHIT provided by the comparators CMP0 through CMPs-1. Bit line pairs corresponding to a way selected by the hit signals are connected to the sense amplifiers.

According to this embodiment, the memory cells MS(D0W0) through MS(D0Ws-1), for example, share one sense amplifier SAD0, which may be laid out within a memory cell width between the cells MS(D0W0) and MS(DWs-1).

In the block of the memory cells D0W1 through D0Ws-1, the selector WSD0 is disposed between the memory cells and the sense amplifier SAD0. Namely, the selector is included in the block (a core circuit). This means that the block of the memory cells, selector, and sense amplifier may be repeatedly fabricated n times, to easily form an n-bit data memory arrangement.

Figure 6:
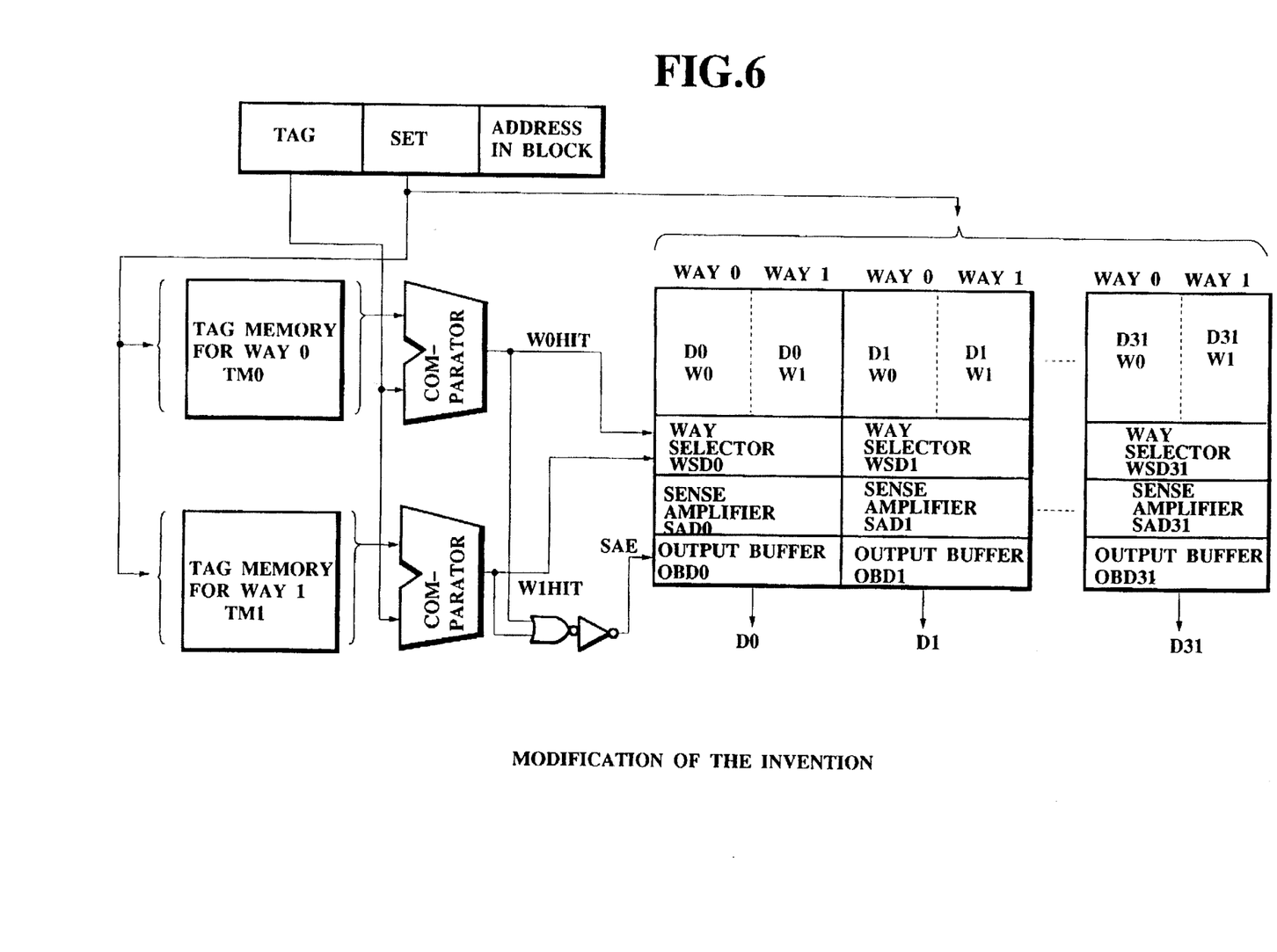
FIG. 6 is a schematic view showing a 2-way cache memory according to the second embodiment of the invention.

FIG. 6 shows the details of a 2-way set-associative cache memory having a read bit width of 32, according to the second embodiment of the invention.

A comparator CMP0 (CMP1) receives a signal from a tag TAG and a signal from a tag memory TM0 (TM1) and provides a way hit signal W0HIT (W1HIT), which is supplied to way selectors WSD0 through WSD31 corresponding to bits D0 through D31, respectively. According to the way hit signals W0HIT and W1HIT, each of the selectors selects a hit one of the ways 0 and 1.

The two signals W0HIT an W1HIT are ORed to provide a signal SAE, which is supplied to the enable terminals of sense amplifiers SAD0 through SAD31 corresponding to the bits D0 through D31, respectively. As soon as one of the ways 0 and 1 is hit, the sense amplifiers are activated.

Figure 7:
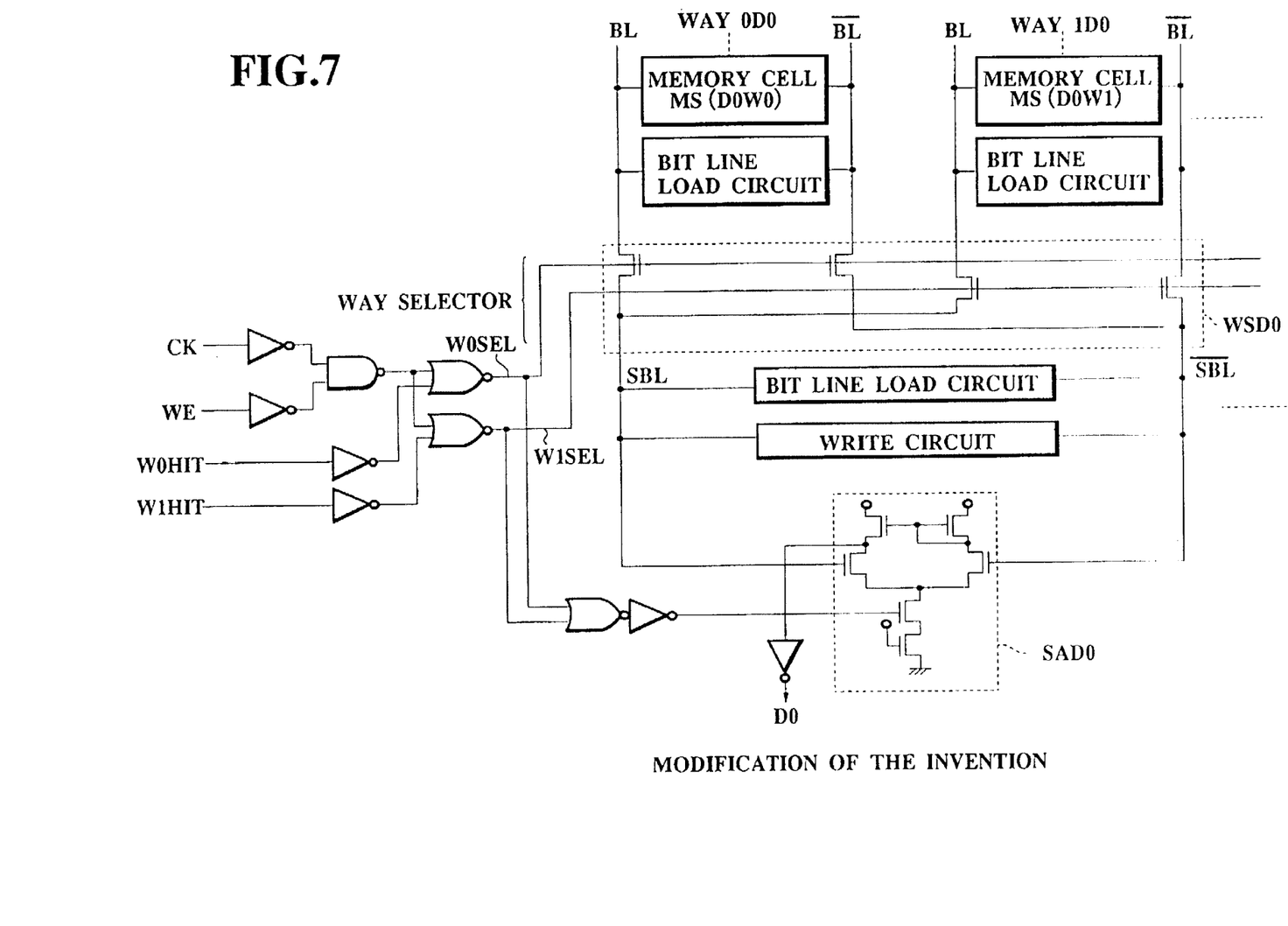
FIG. 7 is a view showing the details of the cache memory according to the second embodiment of FIG. 6.

FIG. 7 is a circuit diagram showing the details of the cache memory of FIG. 6. This figure shows a memory block for the bit D0 among memory blocks for the bits D0 through D31. All of these memory blocks have an identical configuration.

In the figure, the way selector WSD0 comprises n-type MOS transistors (transfer gates). One ends of the transfer gates are connected to pairs of bit lines that are connected to the memory cells MS(D0W0) and MS(D0W1). The other ends of the transfer gates form nodes that are connected to inputs of the sense amplifier SAD0. Gate terminals of the transfer gates receive way selection signals W0SEL and W1SEL, to select a hit one of the ways 0 and 1.

In this way, the sense amplifier SAD0 is shared by the two ways 0 and 1 in the memory block for the bit D0. An enable terminal of the sense amplifier SAD0 receives a signal SAE which is a logic OR of the signals W0SEL and S1SEL. When any one of the ways 0 and 1 is hit, the sense amplifier SAD0 is activated.

A bit line load circuit for high speed operation is connected to each pair of bit lines BL and $\overline{BL}$ on the memory cell side of the transfer gates. Also, a bit line load circuit for high speed operation is connected to a pair of collected bit lines SBL and $\overline{SBL}$ on the sense amplifier side of the transfer gates. In addition, a write circuit is connected to the collected bit lines SBL and $\overline{SBL}$ in the vicinity of the sense amplifier SAD0. These circuits on the sense amplifier side of the transfer gates are shared by the two ways 0 and 1.

The transfer gates may be p-type MOS transistors, or a Combination of n- and p-type MOS transistors.

The cache memory may have a bit width of more than 32 bits, or it may be a multi-port memory. The cache memory may employ any mapping method.

Figure 8:
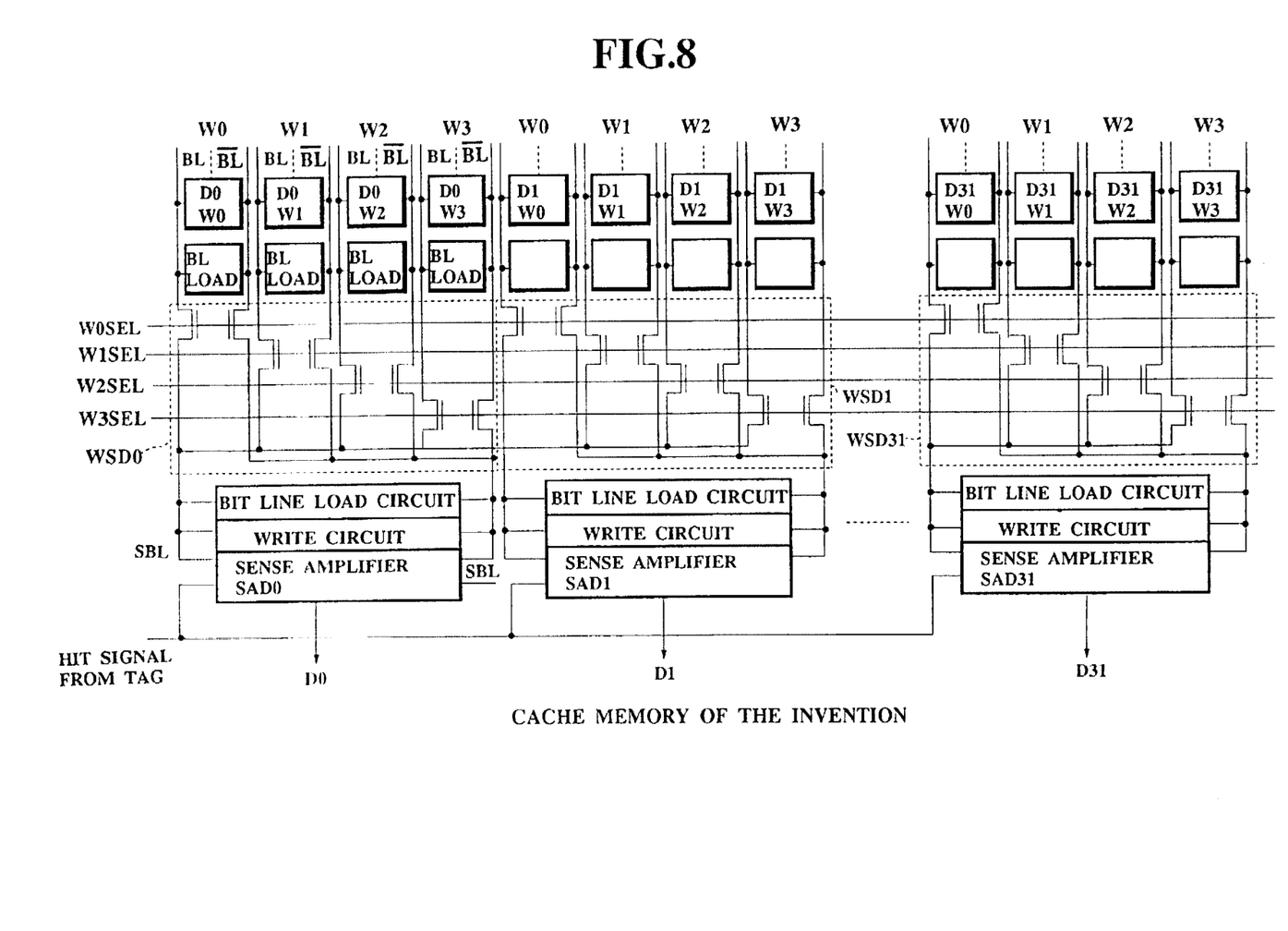
FIG. 8 is a view showing the details of the cache memory according to the second embodiment of FIG. 5.

FIG. 8 shows a 4-way set-associative cache memory having a bit width of 32 bits, according to a modification of the second embodiment of the invention.

Similar to the second embodiment of FIG. 7, the cache memory of FIG. 8 comprises memory blocks for bits D0 through D31, and all of the memory blocks have an identical configuration. As a typical example, the memory block for bit D0 will be explained. This memory block involves the same bits (D0) of four different ways.

A way selector WSD0 comprises n-type MOS transistors (transfer gates). One ends of the transfer gates are connected to bit line pairs that are connected to memory cells MS(D0W0) through MS(D0W3) corresponding to ways 0 through 3, respectively. The other ends of the transfer gates are short-circuited for BLs and $\overline{BLs}$, respectively, and connected to inputs of a sense amplifier SAD0. Input gates of the transfer gates receive hit signals W0SEL through W3SEL. The single sense amplifier SAD0 is shared by the four ways 0 through 3.

A bit line load circuit for high speed operation is connected to each pair of bit lines BL and $\overline{BL}$ on the memory cell side of the transfer gates. Also, a bit line load circuit for high speed operation is connected to a pair of collected bit lines SBL and $\overline{SBL}$ on the sense amplifier side of the transfer gates. In addition, a write circuit is connected to the collected bit lines SBL and $\overline{SBL}$ in the vicinity of the sense amplifier SAD0. These circuits on the sense amplifier side of the transfer gates are shared by the four ways 0 to 3.

The transfer gates may be p-type MOS transistors, or a combination of n- and p-type MOS transistors.

Figure 9:
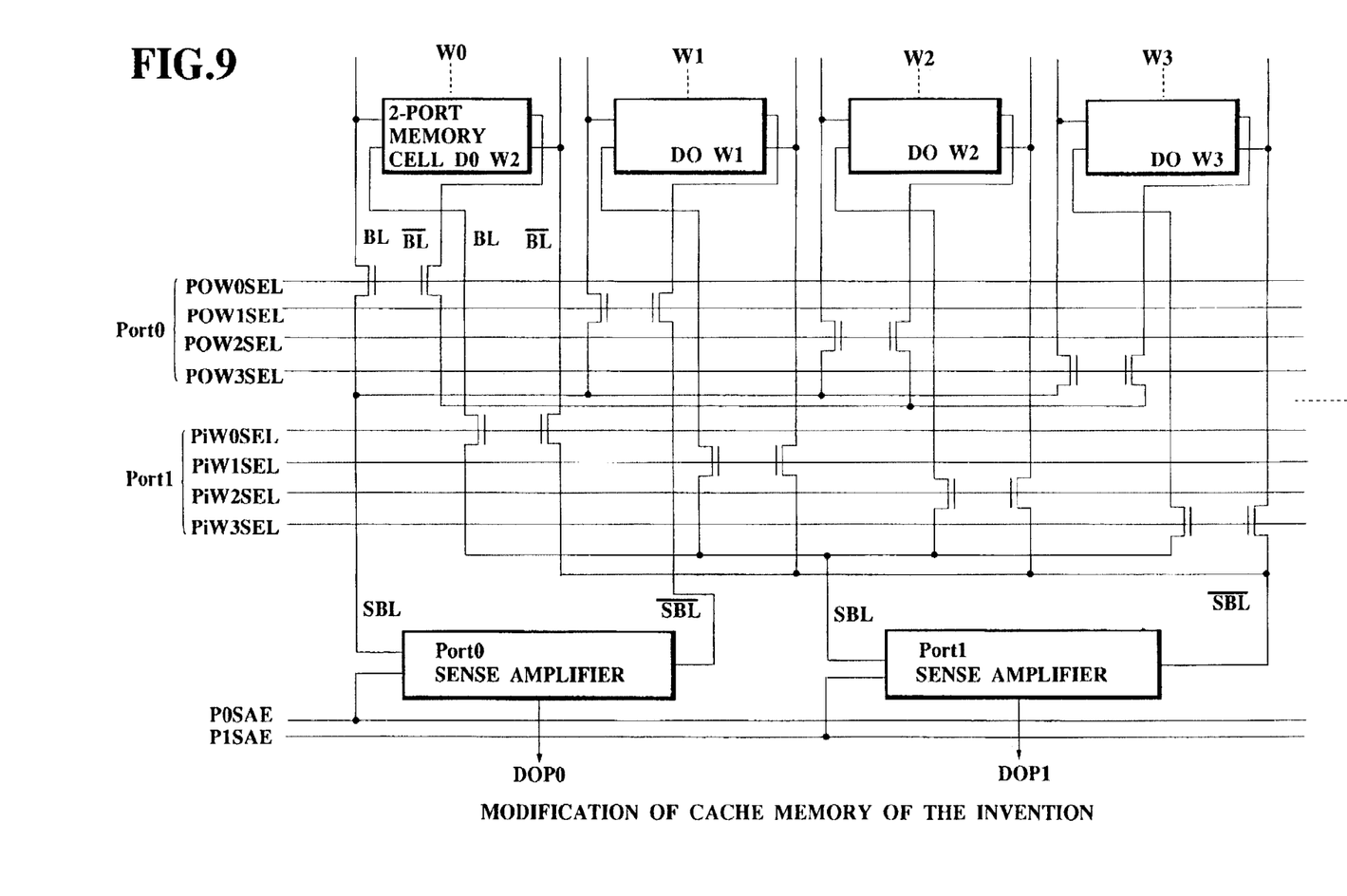
FIG. 9 is a view showing the details of a 2-port 4-way cache memory according to the second embodiment of the invention.

FIG. 9 shows a 2-port 4-way set-associative cache memory according to a modification of the second embodiment of the invention.

Similar to the previous embodiment, n-type MOS transistors are used as transfer gates for selecting ways. The transfer gates are connected to bit line pairs of each port. The bit lines are collected so that one sense amplifier is sufficient for each port. The transfer gates may be p-type MOS transistors, or a combination of n- and p-type MOS transistors. The cache memory may have more than two ports.

In summary, a cache memory according to the invention activates, in a read operation, sense amplifiers according to hit signals from tag memories. The sense amplifiers are activated only when a hit occurs. If a cache miss is detected, or if no cache hit is detected, th sense amplifiers will never be turned ON, to thereby reduce power consumption of the cache memory in the read operation.

Another cache memory according to the invention employs an s-way set-associative mapping system (s being an integer larger than 2). In this cache memory, one sense amplifier is shared by different ways, to reduce the number of sense amplifiers as well as cutting down power consumption of the cache memory to, for example, one fourth of the prior art.

Since each sense amplifier is shared by different ways according to the invention, it is not necessary to arrange each sense amplifier within a bit pitch. This may simplify layout designing of the sense amplifiers.

According to the invention, a selector is disposed in a macro block to switch and collect bit lines. Since ways are switched from one to another outside a memory array, the layout of an output data bus will not be complicated. The same bits of different ways may be collected into a group to share a single sense amplifier. Such group may be repeatedly prepared, to remarkably simplify a fabrication of memory cell arrays.

Various modifications will become possible for those skilled in the art after receiving the teachings of the present disclosure without departing from the scope thereof.

What is claimed is:

1. A set associative cache memory comprising:

a plurality of tag memories, each being provided for storing addresses of data items stored in the set-associative cache memory, each of said plurality of tag memories storing a plurality of the addresses in a one-to-one correspondence with addresses stored in others of said plurality of tag memories;

a plurality of data memory areas for storing said data items, each of said plurality of data memory areas comprising a plurality of memory cells in one-to-one correspondence with said plurality of tag memories and wherein the memory cells of each of said plurality of data memory areas are associated with a particular bit position of a data item and are collectively arranged adjacent to each other in a data memory area, further wherein the memory cells of each of said plurality of data memory areas are independent of the memory cells of others of the plurality of data memory areas storing data of other bit positions of the data items;

a plurality of comparators for comparing a particular address with addresses corresponding to the particular address stored in said plurality of tag memories and generating a hit signal when one address in one tag memory matches said particular address;

a way selector connected to said plurality of comparators and said plurality of data memory areas for selectively outputting one data item from one of said plurality of data memory areas in accordance with the hit signal generated from said plurality of comparators; and a plurality of sense amplifiers connected to said way selector and in a one-to-one correspondence with said plurality of data memory areas to sense and amplify data items generated by said way selector in accordance with the hit signal.

2. The set-associative cache memory as claimed in claim 1 wherein each memory cell has a plurality of output ports, wherein said plurality of sense amplifiers are provided for each output port, and wherein said plurality of sense amplifiers are activated only when the corresponding ports are activated.

3. A set-associative memory comprising:

a data memory for storing data items, the data memory comprising groups of memory cells, the memory cells of each group of memory cells are associated with a particular bit position of a data item and are collectively arranged adjacent to each other in a group of memory cells, further wherein the memory cells of each of said group of memory cells are independent of the memory cells of others of the groups of memory cells storing data of other bit positions of the data items;

a plurality of way selectors, each connected to a different memory cell; and a plurality of sense amplifiers, each sense amplifier connected to a group of way selectors corresponding to one of the groups of memory cells.

4. The set-associative memory according to claim 3, further comprising:

a tag memory storing addresses of the data items stored in the data memory; and means for accessing data items from the data memory corresponding to addresses stored in the tag memory.

5. The set-associative memory according to claim 4, wherein the tag memory comprises a plurality of tag memory areas, each of the plurality of tag memory areas storing an address of a data item.

6. The set-associative memory according to claim 5, wherein the accessing means includes a plurality of comparators respectively connected to the plurality of tag memory areas.

* * * * *